Aug. 6, 1963    H. SCHIPPERS    3,099,860
PROCESS AND APPARATUS FOR PRODUCING TUBULAR
PRODUCTS FROM PLASTIC MATERIALS
Filed June 26, 1961    2 Sheets-Sheet 2

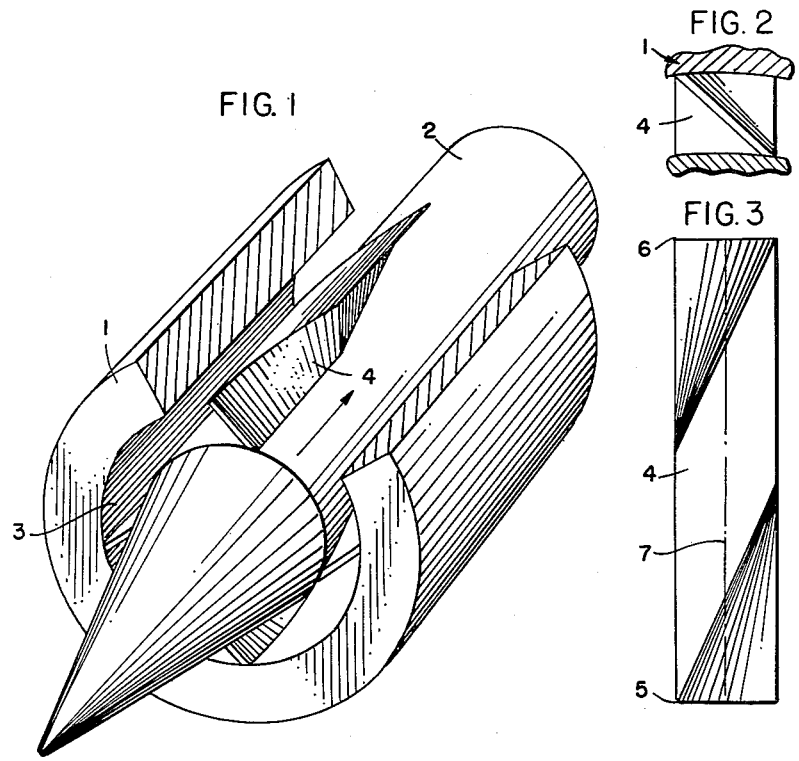

INVENTOR:
HEINZ SCHIPPERS
BY Marzall Johnston
Cook & Root
ATT'YS

United States Patent Office 3,099,860
Patented Aug. 6, 1963

3,099,860
PROCESS AND APPARATUS FOR PRODUCING TUBULAR PRODUCTS FROM PLASTIC MATERIALS
Heinz Schippers, Remscheid-Lennep, Germany, assignor to Barmer Maschinenfabrik A.G., Wuppertal-Oberbarmen, Germany
Filed June 26, 1961, Ser. No. 119,358
Claims priority, application Germany June 28, 1960
8 Claims. (Cl. 18—14)

The present invention is directed to a process and apparatus for producing tubular or tubular-foil products from thermoplastic materials. More particularly, the subject invention is directed to the process and apparatus for producing tubular products from plastic materials, which products are substantially free of undesirable flow lines.

The formation of tubular products from plastic materials presents several problems. Such products are usually prepared by passing a viscous plastic mass through an annular passage in a nozzle head. Of necessity the mass is divided at one or more points by supporting members located within the passage. It is well known that serious difficulties are encountered in attempting to reunite the mass flow into a homogeneous product. Depending upon the viscosity of the material being processed, flow seams or lines are formed in the product to a greater or lesser degree. These flow lines, which are caused by the delayed boundary layers of the cut edges, mar the appearance of the product and also lessen its strength. In many instances such defects are of significant importance. This is true, for example, where transparent tubular foils are manufactured from thermoplastic synthetic materials of high melting viscosity such as polyvinyl chloride, cellulose acetate, and the like.

Considerable effort has been expended to avoid these undesirable flow characteristics but such efforts have not met with any substantial degree of success. In one such attempt, axial nozzle heads which are normally equipped with symmetrically and radially arranged fins of streamlined cross-section profile for supporting the mandrel in the throughput passage have been replaced by fins of spiral shape or fins running tangentially between the mandrel and the housing. The use of such fins was intended to make the unavoidable division of the material flow in layers as concentric as possible and thereby prevent the differing structure of the flow and the formation of sector effects with flow seams. Further, it has been proposed that the longtiudinal markings in the product be obliterated by imparting to the mass flow in the region of the limiting walls formed by the housing on the one hand and the mandrel on the other hand a counter-rotation by means of corresponding winding and counter-winding recesses in the passage walls. In this manner the inner and outer layers of the mass are displaced with respect to the main flow.

The above described prior art techniques not only are incapable of completely avoiding the flow seams which are caused by the support fins, but, additionally, the production of such devices is difficult and expensive.

It is an object of the present invention to provide a process for producing tubular structures from thermoplastic masses which avoids the formation of undesirable flow seams or lines.

Another object of the invention is to provide an apparatus for producing structurally sound and attractive tubular plastic products.

Other objects will become apparent to those skilled in the art from the following detailed description of the invention.

In general, the subject invention is based on the discovery that the formation of a structurally homogeneous mass can be achieved by causing a thorough mixing of the divided mass flow after the mass leaves the area of the support fins. It is preferred that this mixing take place before the material leaves the nozzle head. This is true whether the nozzle head is designed as an axial nozzle in which the mass is divided by several individual mandrel supporting fins or whether the nozzle is designed as a deflection nozzle head in which the mass is divided by the mandrel.

It is well known that the individual strands of plastic material between the fins in the throughput passage are subjected to differing flow speeds in various zones from the middle portion to the boundary layers. Furthermore, trials with an axial nozzle head have shown that in the reuniting of individual strands beyond the fins, zones of equal flow speeds are encountered, especially when those strands which have undergone a severe retardation in the boundary layer met one another. This is believed to be the cause of the pronounced structural disturbances in the product. The same condition is present in deflection nozzle heads having a shell-like supporting system normally surrounding the mandrel. In such nozzle heads the plastic mass flow is divided by the mandrel and is deflected by an end of the mandrel-supporting system designed as a curved track and is then again brought together. The subject invention is based on the concept of conducting the divided mass in the throughput passage in such a manner that the reuniting of the plastic mass takes place with a thorough mixing, especially at the cutting edges. This thorough mixing prevents the formation of undesirable flow lines or seams.

In carrying out the subject process the divided mass flow passing through the supporting device is subjected at its cutting edges to differing speeds by means of obliquely placed guide surfaces. The setting angle of these guide surfaces changes in the direction of flow whereby mass edges moving at reduced speed are brought together with mass edges of a higher velocity and having differing states of energy.

In accordance with the inventive concept the axial nozzle includes mandrel-supporting radially directed fins which divide the mass flow in the throughput passage. These fins, which act as guide and mixing members, are shaped in the manner of a rhomboid ship's hull whose bow and stern are arranged oppositely in its longitudinal direction with respect to the plane of symmetry of the starting body.

Correspondingly, the above concept can be applied to deflection nozzle heads having a supporting system surrounding the mandrel in shell fashion. In such systems one end of the supporting shell forms a curved path conducted on both sides around the mandrel for deflecting the plastic mass. It is proposed in accordance with the subject invention that one of the two adjoining curved path parts be allowed to run toward its end with a steeper setting angle than the other. Alternatively, the curved path can be designed in such a manner that it terminates in an edge which is directed secantially to the circumference of the mandrel-supporting shell and, if desired, obliquely to the radial plane. The guide bodies or surfaces cutting the mass flow and bringing it together again may be mounted uniformly or obliquely in stages.

The details of the invention will become clear by reference to the attached drawing in which:

FIGURE 1 is a perspective view of an axial nozzle head of the subject invention with a portion of the nozzle casing cut away;

FIGURE 2 is an end view of one of the radial fins which support the mandrel throughput passage;

FIGURE 3 is a top view of the radial fin of FIGURE 2;

Figure 4:
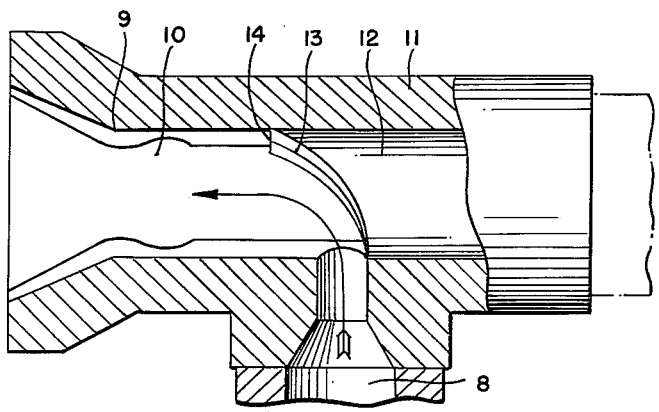
FIGURE 4 is a sectional view of a deflection nozzle head which has been designed in accordance with the subject invention.

FIG. 1 sets forth the essential parts of an axial nozzle head which is formed in accordance with the present invention. FIGS. 2 and 3 set forth an end and top view of a fin of the subject nozzle head. Casing 1 and mandrel 2 define a passage 3 of annular cross-section through which the plastic mass which is to be shaped in tubular form is passed. Mandrel 2 is supported in the usual manner by means of fixed radial fins 4. In accordance with the present invention these fins are designed as guide and mixing bodies and are shaped in the manner of a rhomboid ship's hull whose bow 5 and stern 6 are arranged oppositely with respect to the plane of symmetry 7 of the supporting body in the latter's longitudinal direction. The bow, stern, and plane of symmetry of the fin can best be understood by reference to FIGS. 2 and 3 of the drawing.

As the plastic mass is moved through passage or channel 3 in the direction of the arrow, the body of material is subdivided by fins 4 into individual strands which reunite behind strap ends 6. Because of the twisted form of the fins the edges of the individual strands or units of the plastic stream are subjected to different speeds on either side of a fin. For this reason when the components are brought together a mass of retarded velocity is joined with a mass of accelerated velocity whereby good mixing is assured. In this manner the undesirable flow lines, etc., which ordinarily appear in a product can be avoided or controlled to an extent that such imperfections no longer adversely affect either the appearance or the strength of the product.

FIG. 4 sets forth essential parts of a deflection nozzle head which is designed in accordance with the subject invention. As was the case in connection with FIG. 1, the nonessential parts of the nozzle head have been left out. In this device the plastic mass flows into the nozzle head from worm passage 8 and is deflected into throughput channel 9 which lies at a right angle to the worm axis. The plastic mass is divided by mandrel 10. The mandrel is seated in a customary manner in shell-type holding device 12 which is fixedly attached to nozzle head housing 11. The front annular surface 13 of holding device 12 is designed in accordance with the present invention as a curved path in such a manner that it ends in an edge 14 which is secantially directed to the circumference of the mandrel-supporting shell and, if desired, obliquely to the radial plane. In one embodiment, one of the curved paths of the supporting system has a steeper angle of pitch than the edge coming up and around the other side of the mandrel.

Figure 5:
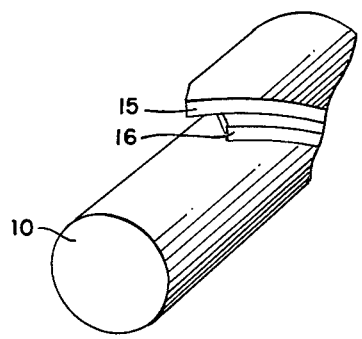
FIGURE 5 is a perspective view showing a particular arrangement of the curved deflecting surfaces at the end of the shell-like mandrel-supporting system.

In FIG. 5 a modification of a deflection nozzle head is set forth in which the curved edges 15 and 16 of the supporting device are slightly offset. By this steplike arrangement it is likewise possible to impart a differing velocity to the two edges of the flowing mass which assures effective mixing of the two sections of the mass when they are reunited.

Obviously many modifications and variations of the invention as hereinbefore set forth may be made without departing from the spirit and scope thereof, and therefore only such limitations should be imposed as are indicated in the appended claims.

I claim:
1. A process for the production of tubular products from thermoplastic materials which comprises passing a thermoplastic flowable mass through a nozzle head, dividing said flowable mass within said nozzle head, adjusting the speed of the edges of the divided mass so that said edges move at differing speeds, and thereafter reuniting said edges, one edge of said divided mass maintaining a higher velocity and state of energy than its associated edge as said edges are brought together, whereby a zone of thorough mixing is created in the area in which said edges are reunited.

2. An axial nozzle head for producing tubular structures of thermoplastic material which comprises a mandrel, an annular throughput passage surrounding said mandrel, said passage being defined by said mandrel and the casing of said nozzle head, and radially disposed fins attached to said mandrel and said casing, said fins acting as support members for said mandrel, said fins having the shape of a rhomboid ship's hull whose bow and stern are twisted oppositely with respect to the plane of symmetry of the fin in its longitudinal direction.

3. A deflection nozzle head for forming tubular products from thermoplastic materials which comprises a mandrel, a shell-like supporting system enclosing one end of said mandrel, a nozzle head housing around said mandrel, said housing and said mandrel defining an annular throughput channel, and inlet means for supplying flowable thermoplastic material to said annular throughput channel, one end of said shell-like supporting system forming a curved path conducted on both sides and around said mandrel, said curved path being characterized by the fact that one of the two curved edges has a greater angle of pitch than the other edge of said path.

4. A deflection nozzle head for forming tubular products from thermoplastic materials which comprises a mandrel, a shell-like supporting system enclosing one end of said mandrel, a nozzle head housing around said mandrel, said housing and said mandrel defining an annular throughput channel, and inlet means for supplying flowable thermoplastic material to said annular throughput channel, one end of said shell-like supporting system forming a curved path conducted on both sides and around said mandrel, said curved path terminating in an edge which is secantially directed to the circumference of said support system.

5. A deflection nozzle head as in claim 4 wherein the edge of said curved path is arranged obliquely to the radial plane of said mandrel.

6. A nozzle head for forming tubular products from thermoplastic materials which comprises: a mandrel, a nozzle head housing around said mandrel, said housing and said mandrel defining an annular throughput channel, support means for maintaining said mandrel within said nozzle head housing, said support means including guide surfaces for guiding the flow of thermoplastic material through said annular channel, the angle of incidence to the material flow changing in said guide surfaces from the inner surface of said thermoplastic material to the outer surface of said thermoplastic material, and means for delivering thermoplastic material to said annular channel and means for withdrawing said thermoplastic material from said annular channel.

7. A nozzle head as in claim 6 wherein said guide surfaces are offset providing a steplike arrangement.

8. A process for the production of tubular products from thermoplastic materials which comprises: passing a thermoplastic flowable mass through a nozzle head, dividing said flowable mass within said nozzle head by means of guide surfaces, said guide surfaces being so arranged as to change the velocity of the two edge surfaces of the divided material and likewise to change the velocity of the material flowing in the inner region of said nozzle head and the velocity of the material flowing in the outer region of said nozzle head, and thereafter reuniting said material whereby a zone of thorough mixing is created in the area in which said material is reunited.

References Cited in the file of this patent

UNITED STATES PATENTS

| | | |
|---|---|---|
| 2,192,263 | Johnson | Mar. 5, 1940 |
| 2,354,363 | Burry | July 25, 1944 |
| 2,480,838 | Caron | Sept. 6, 1949 |
| 2,740,160 | McKee et al. | Apr. 3, 1956 |
| 2,979,772 | Moslo | Apr. 18, 1961 |

FOREIGN PATENTS

| | | |
|---|---|---|
| 1,237,535 | France | June 20, 1960 |